(12) United States Patent
Bhattad et al.

(10) Patent No.: US 9,742,515 B2
(45) Date of Patent: *Aug. 22, 2017

(54) REFERENCE SIGNAL DETECTION

(71) Applicant: QUALCOMM Incorporated, San Diego, CA (US)

(72) Inventors: Kapil Bhattad, Bangalore (IN); Yi Huang, San Diego, CA (US); Tao Luo, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 504 days.

This patent is subject to a terminal disclaimer.

(21) Appl. No.: 14/450,157

(22) Filed: Aug. 1, 2014

(65) Prior Publication Data

US 2014/0334434 A1 Nov. 13, 2014

Related U.S. Application Data

(63) Continuation of application No. 13/467,945, filed on May 9, 2012, now Pat. No. 8,934,326.

(Continued)

(51) Int. Cl.
*H04J 1/12* (2006.01)
*H04J 11/00* (2006.01)

(52) U.S. Cl.
CPC .................... *H04J 11/005* (2013.01)

(58) Field of Classification Search
USPC ............... 370/201, 216, 241, 252, 317, 328
See application file for complete search history.

(56) References Cited

U.S. PATENT DOCUMENTS 8,934,326 B2 * 1/2015 Bhattad ............... H04J 11/005
370/201
2010/0118989 A1 5/2010 Sayana et al.
(Continued)

FOREIGN PATENT DOCUMENTS

CN 101841357 A 9/2010
EP 2381709 A1 10/2011
(Continued)

OTHER PUBLICATIONS

Notice to File a Response for Korean Application No. 10-2014-7015171 dated Oct. 26, 2015, 3 pages.
(Continued)

*Primary Examiner* — Kwang B Yao
*Assistant Examiner* — Nguyen Ngo
(74) *Attorney, Agent, or Firm* — Arent Fox, LLP

(57) ABSTRACT

Aspects of the disclosure are related to identifying whether an apparatus (e.g., base station, access point, etc.) is transmitting using a CRS based transmission scheme or a UE-RS based transmission scheme. Such detection may be necessary for PDSCH interference cancellation (IC) of a neighboring cell since a UE may not know which transmission scheme is used by the neighboring cell. For instance, the UE may know the transmission scheme of the serving cell, but the UE may not know the transmission scheme of a neighboring non-serving cell. As such, aspects of the disclosure provide for a blind detection algorithm to identify or determine a transmission mode or transmission scheme of a neighboring cell to then apply interference cancellation (IC) to an interfering signal received from the neighboring cell.

32 Claims, 15 Drawing Sheets

Related U.S. Application Data

(60) Provisional application No. 61/556,596, filed on Nov. 7, 2011.

(56) References Cited

U.S. PATENT DOCUMENTS

| | | | |
|---|---|---|---|
| 2010/0232384 A1* | 9/2010 | Farajidana | H04L 5/005 370/329 |
| 2010/0272004 A1 | 10/2010 | Maeda et al. | |
| 2010/0278132 A1 | 11/2010 | Palanki et al. | |
| 2010/0309861 A1 | 12/2010 | Gorokhov et al. | |
| 2011/0032839 A1 | 2/2011 | Chen et al. | |
| 2011/0038330 A1 | 2/2011 | Luo et al. | |
| 2011/0103324 A1 | 5/2011 | Nam et al. | |
| 2011/0143773 A1 | 6/2011 | Kangas et al. | |
| 2011/0170496 A1 | 7/2011 | Fong et al. | |
| 2011/0194536 A1* | 8/2011 | Kim | H04L 5/0023 370/335 |
| 2011/0237267 A1 | 9/2011 | Chen et al. | |
| 2011/0237270 A1 | 9/2011 | Noh et al. | |
| 2012/0122440 A1 | 5/2012 | Krishnamurthy et al. | |
| 2012/0213096 A1* | 8/2012 | Krishnamurthy | H04L 5/001 370/252 |
| 2012/0243500 A1* | 9/2012 | Chandrasekhar | H04W 72/02 370/330 |
| 2012/0327981 A1* | 12/2012 | Sayana | H04B 7/024 375/219 |
| 2013/0044685 A1* | 2/2013 | Fong | H04J 11/0053 370/328 |
| 2013/0058424 A1* | 3/2013 | Enescu | H04B 7/0486 375/267 |
| 2013/0083780 A1 | 4/2013 | Luo et al. | |
| 2013/0114437 A1* | 5/2013 | Yoo | H04J 11/005 370/252 |
| 2013/0114438 A1 | 5/2013 | Bhattad et al. | |

FOREIGN PATENT DOCUMENTS

| | | |
|---|---|---|
| JP | 2013502117 A | 1/2013 |
| JP | 2014534765 A | 12/2014 |
| WO | 2010105229 A1 | 9/2010 |
| WO | 2011018121 A1 | 2/2011 |
| WO | 2011118993 A2 | 9/2011 |
| WO | 2011130409 A1 | 10/2011 |
| WO | 2013064897 A1 | 5/2013 |

OTHER PUBLICATIONS

Panasonic, Possibility of UE Side ICI Cancellation in Hetnet, 3GPP R1-101274, Feb. 26, 2010.

Translation of First Office Action for Japanese Patent Application No. 2015-148883 dated Sep. 20, 2016, 4 pages.

International Search Report and Written Opinion—PCT/US2012/037313—ISA/EPO—Jul. 23, 2012.

Notice to File a Response for Korean Application No. 10-2014-7015171 dated Jun. 5, 2015, 3 pages.

Translation of First Office Action issued in Chinese Application No. 201280060425.0 dated Jun. 18, 2015, 3 pages.

Translation of Office Action for Japanese Patent Application No. 2014-541035 dated Apr. 28, 2015, 2 pages.

* cited by examiner

REFERENCE SIGNAL DETECTION

CROSS-REFERENCE TO RELATED APPLICATION(S)

This application is a continuation of U.S. Non-provisional application Ser. No. 13/467,945, entitled "REFERENCE SIGNAL DETECTION" and filed on May 9, 2012, which claims the benefit of U.S. Provisional Application Ser. No. 61/556,596, entitled "REFERENCE SIGNAL DETECTION" and filed on Nov. 7, 2011, which are expressly incorporated by reference herein in their entirety.

BACKGROUND

Field

The present disclosure relates generally to communication systems, and more particularly, to reference signal detection in wireless communication systems.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

As described herein, aspects of the disclosure are related to identifying whether an apparatus (e.g., base station, access point, etc.) is transmitting using a CRS based transmission scheme or a UE-RS based transmission scheme. Such detection may be necessary for interference cancellation (IC) of a neighboring cell since a UE may not know which transmission scheme is used by the neighboring cell. For instance, the UE may know the transmission scheme of the serving cell, but the UE may not know the transmission scheme of a neighboring non-serving cell. As such, aspects of the disclosure provide for a blind detection algorithm to identify or determine a transmission mode or transmission scheme of a neighboring cell to then apply interference cancellation (IC) to an interfering signal received from the neighboring cell. In an implementation, interference cancellation (IC) may include PDSCH IC. In other implementations, the CRS versus UE-RS detection scheme may be used in other scenarios not involving PDSCH IC or not involving multiple cells. Further, the detection techniques described herein may be based on a received signal. However, in reference to PDSCH IC, it should be noted that the detection techniques described herein may be based on the received signal minus an estimated serving cell signal. For instance, the serving cell signal may be cancelled, and the remaining signal is the received signal minus the serving cell signal.

In accordance with aspects of the disclosure, a method, an apparatus, and a computer program product for cancelling interference over wireless communications includes receiving a signal, the received signal including a first cell signal from a first cell and a second cell signal from a second cell, detecting a transmission scheme of the second cell signal, determining whether the transmission scheme comprises a common reference signal (CRS) based transmission scheme or a UE reference signal (UE-RS) based transmission scheme, and cancelling interference from the received signal due to the second cell signal based, at least in part, on the determined transmission scheme.

DETAILED DESCRIPTION

Figure 1:
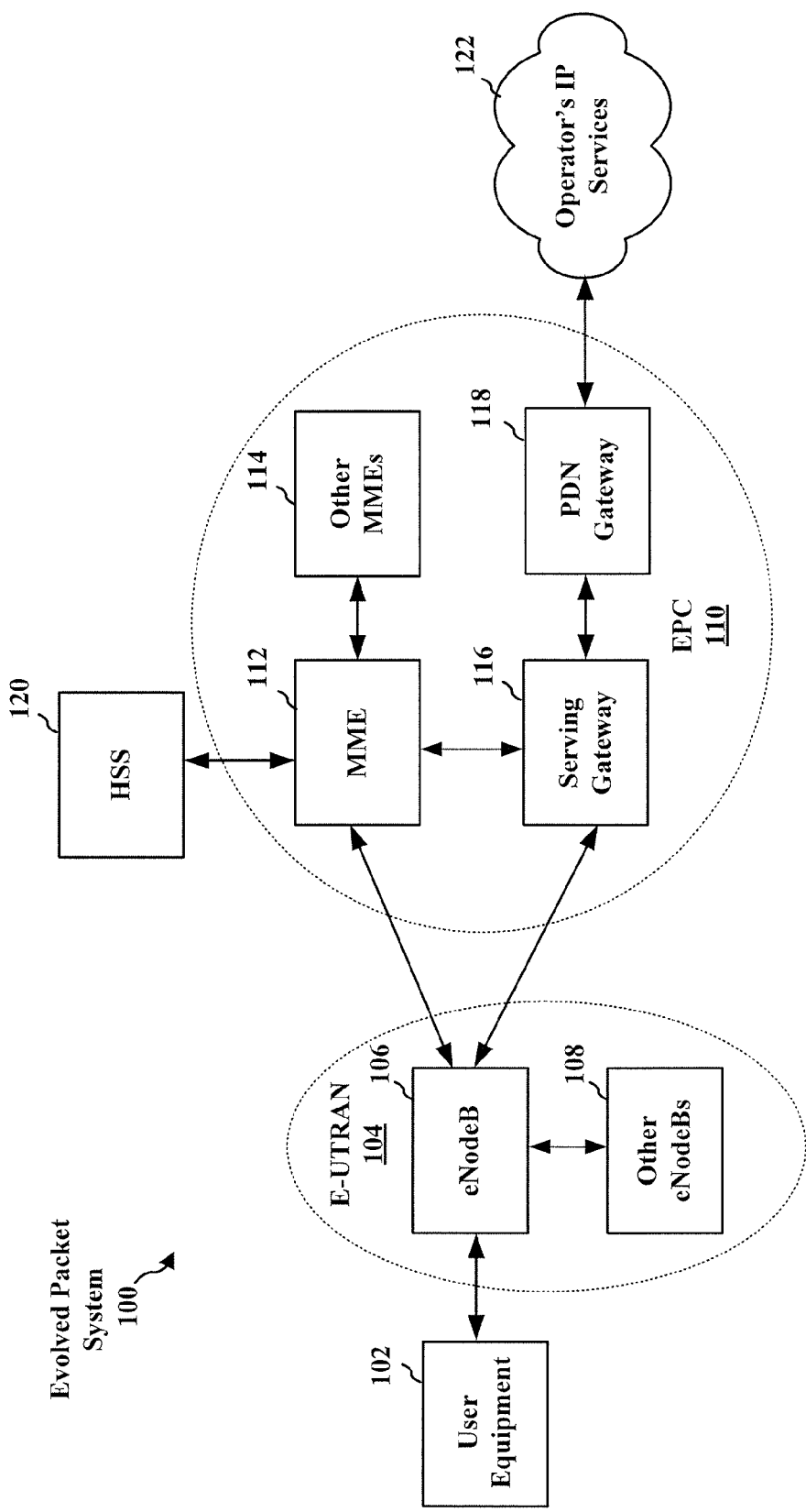
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
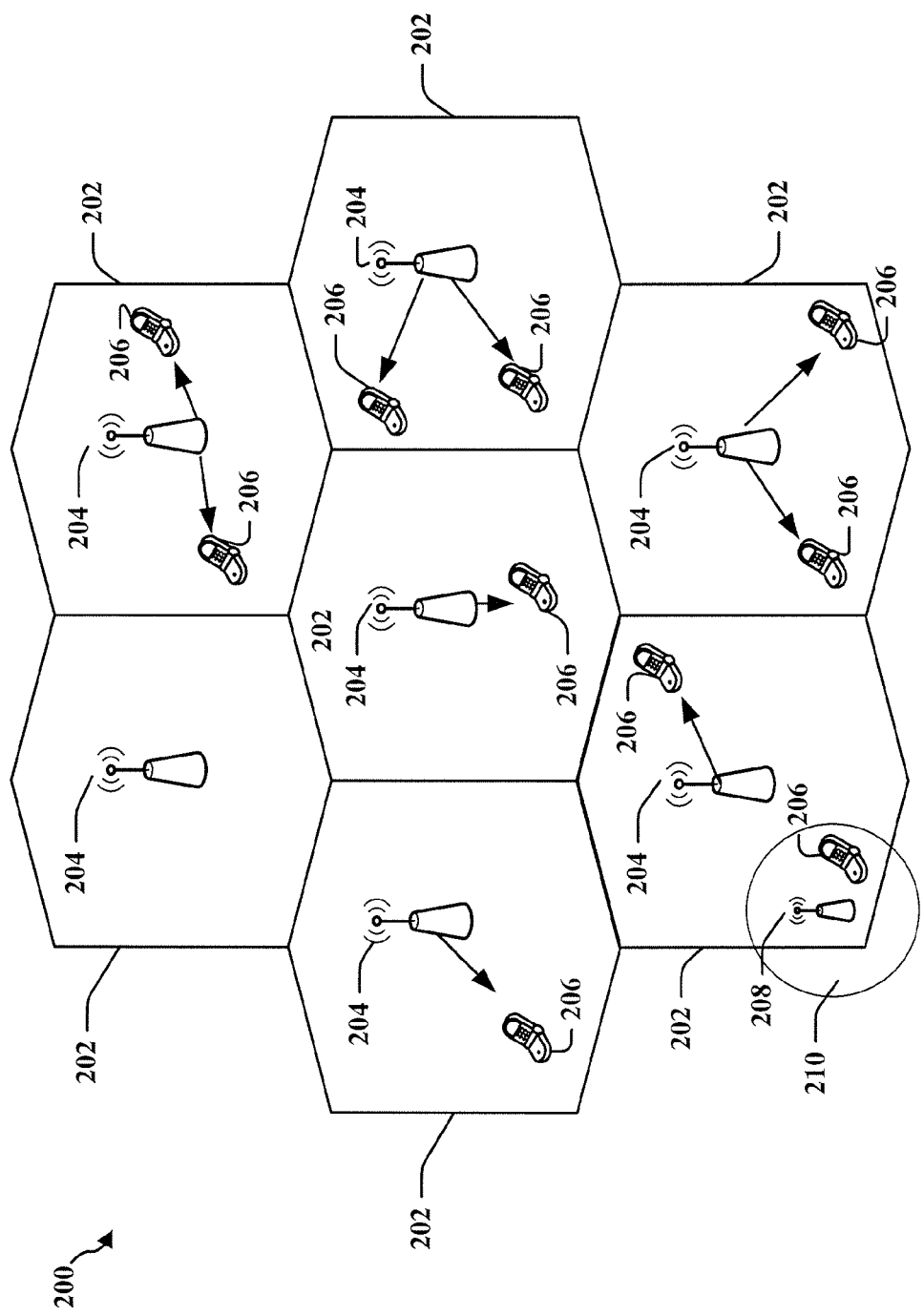
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be, for example, a remote radio head (RRH). Alternatively, the lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
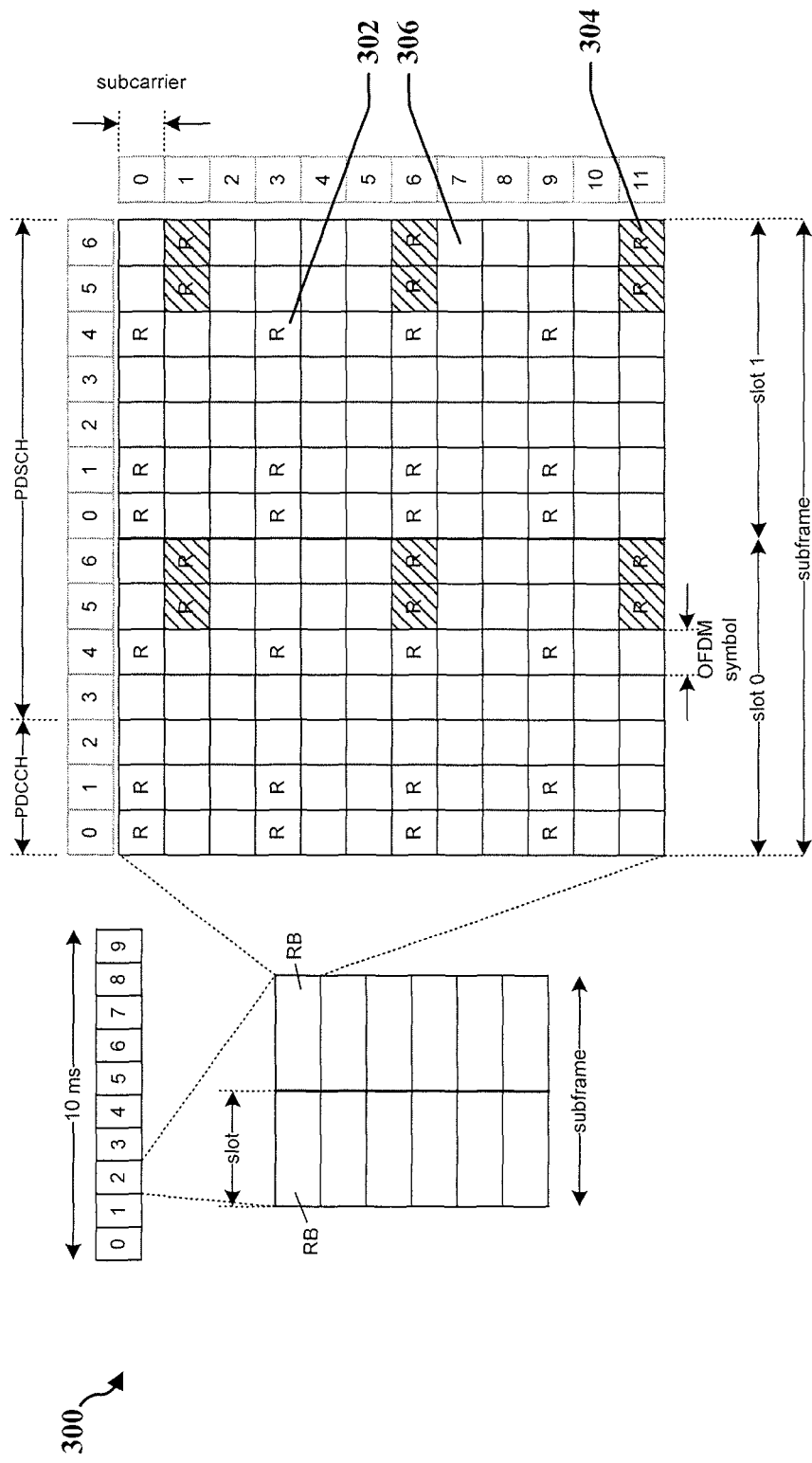
FIG. 3 is a diagram illustrating an example of a DL frame structure in LTE.

FIG. 3 is a diagram 300 illustrating an example of a downlink (DL) frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). Some of the resource elements may include data 306. As shown in FIG. 3, the DL-RS includes Cell-specific RS (CRS) (which may be referred to as common RS) 302 and UE-specific RS (UE-RS) 304 (shown with antenna port 9 or 10 configuration). UE-RS 304 are not transmitted on the resource blocks upon which the corresponding physical DL control channel (PDCCH) is mapped. As such, UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
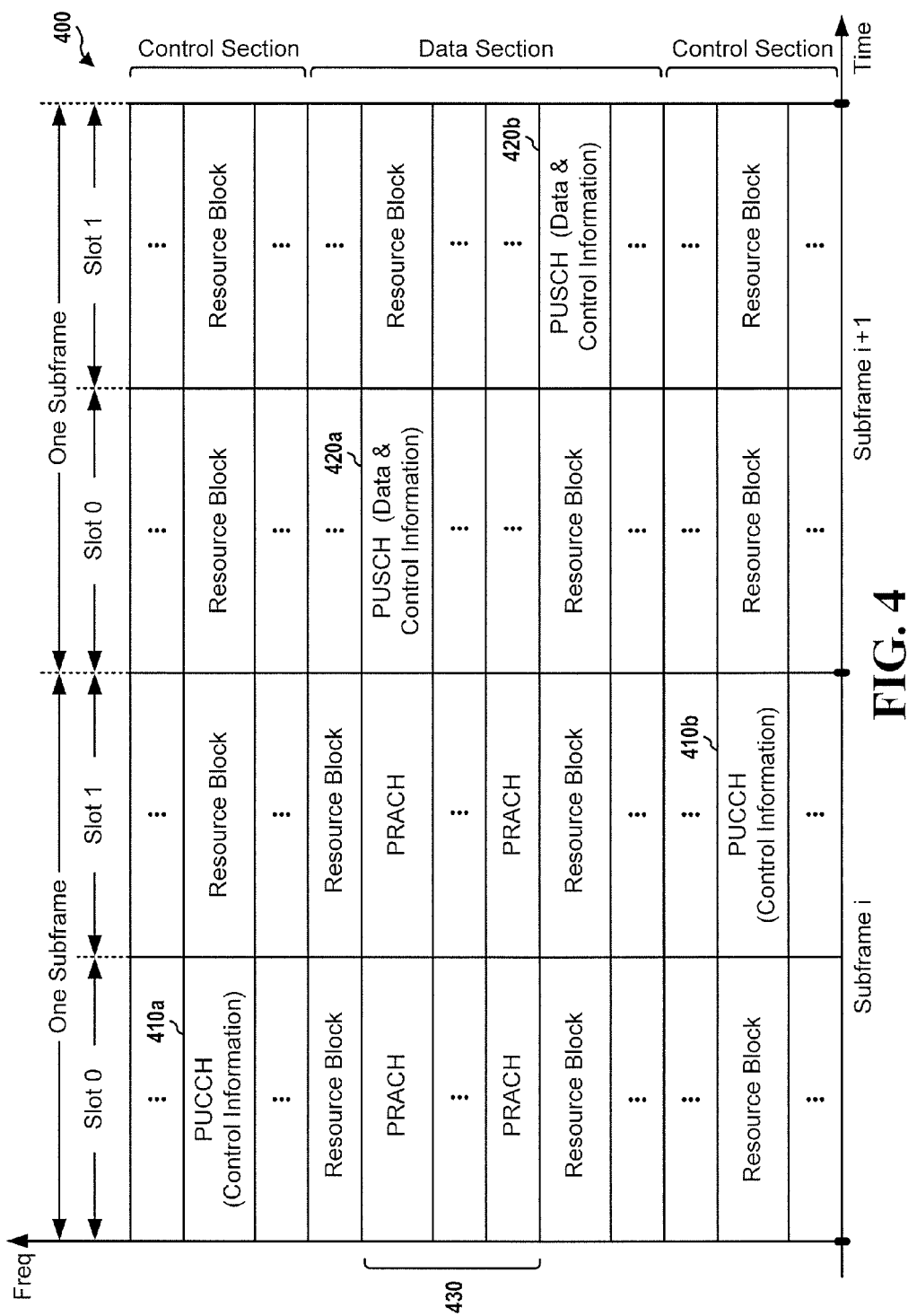
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
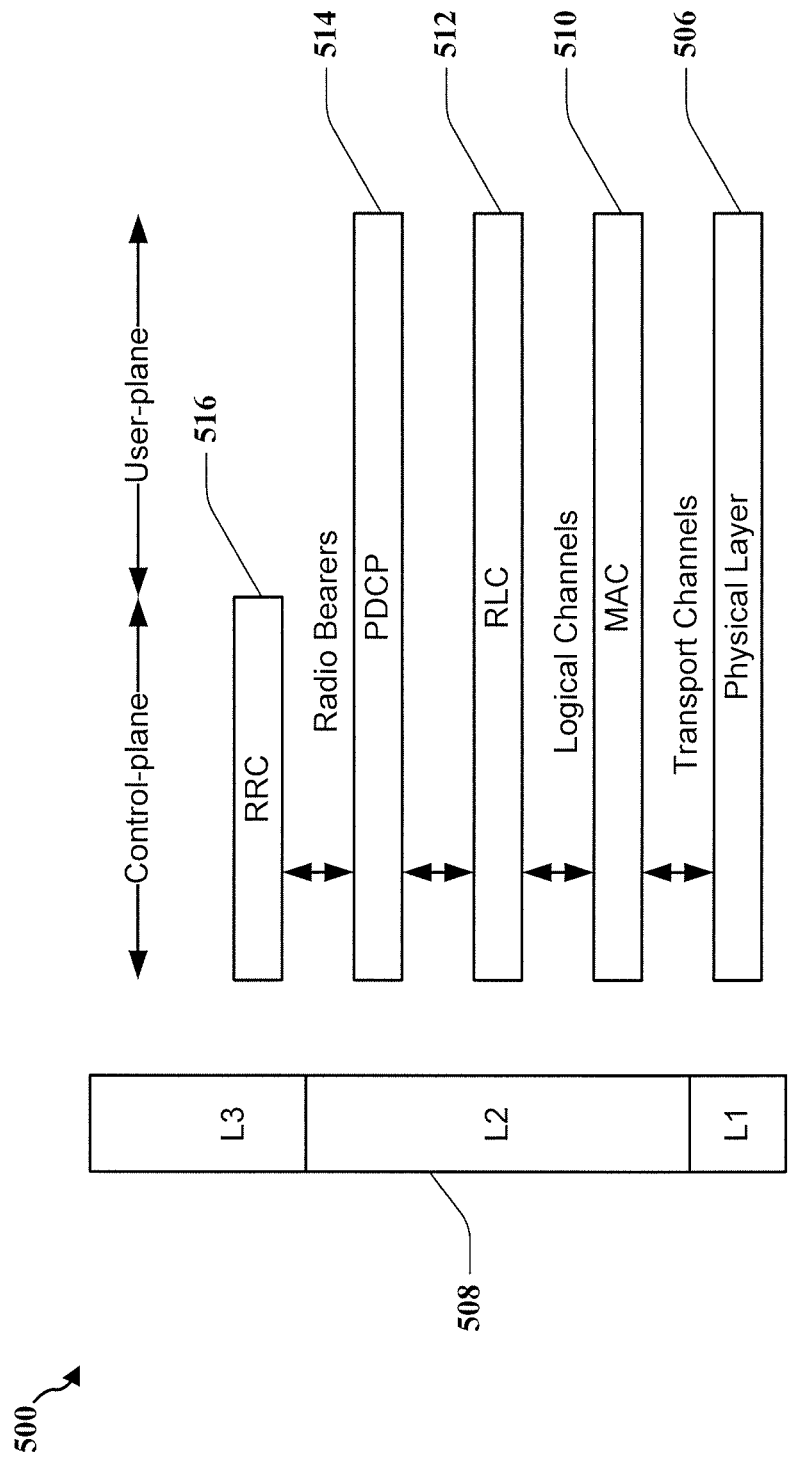
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
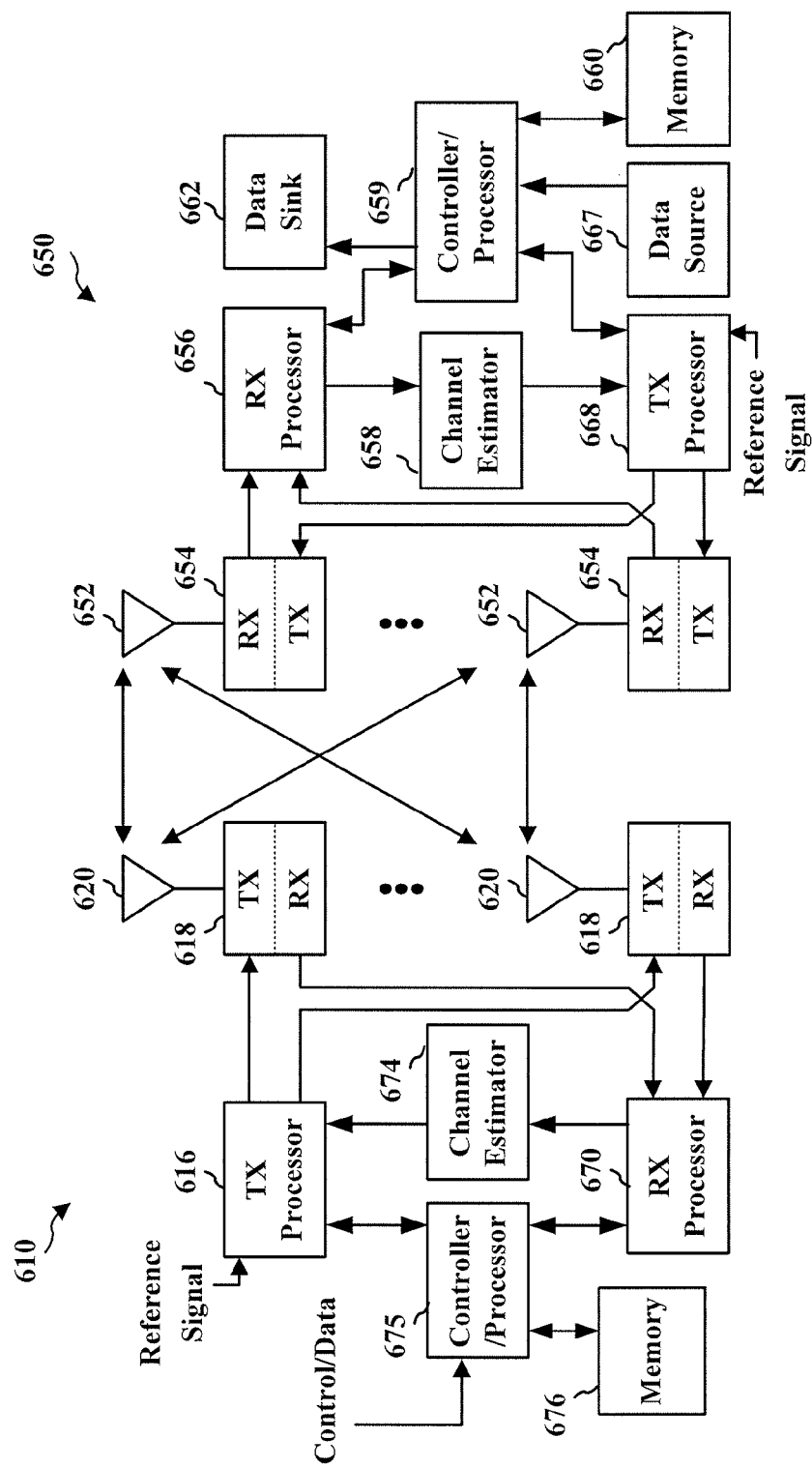
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
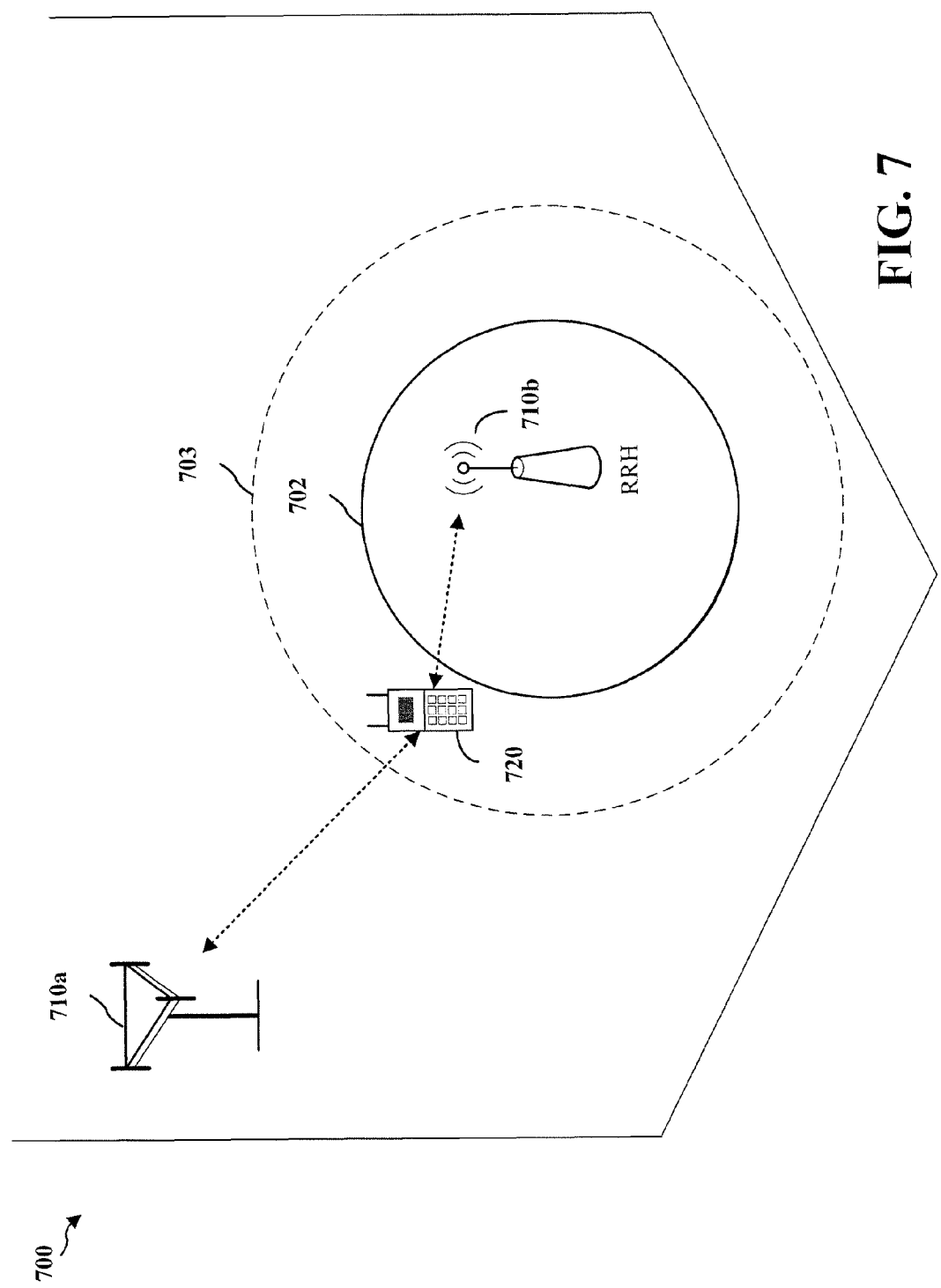
FIG. 7 is a diagram illustrating a range expanded cellular region in a heterogeneous network.

FIG. 7 is a diagram 700 illustrating a cell range expansion (CRE) region in a heterogeneous network. A lower power class eNB such as the pico 710b may have a CRE region 703 that extends beyond the region 702. The lower power class eNB is not limited to pico eNB, but may also be a femto eNB, relay, a remote radio head (RRH), etc. Pico 710b and the macro eNB 710a may employ enhanced inter-cell interference coordination techniques, UE 720 may employ interference cancellation. In enhanced inter-cell interference coordination, the pico 710b receives information from the macro eNB 710a regarding an interference condition of the UE 720. The information allows the pico 710b to serve the UE 720 in the range expanded cellular region 703 and to accept a handoff of the UE 720 from the macro eNB 710a as the UE 720 enters the range expanded cellular region 703.

Figure 8:
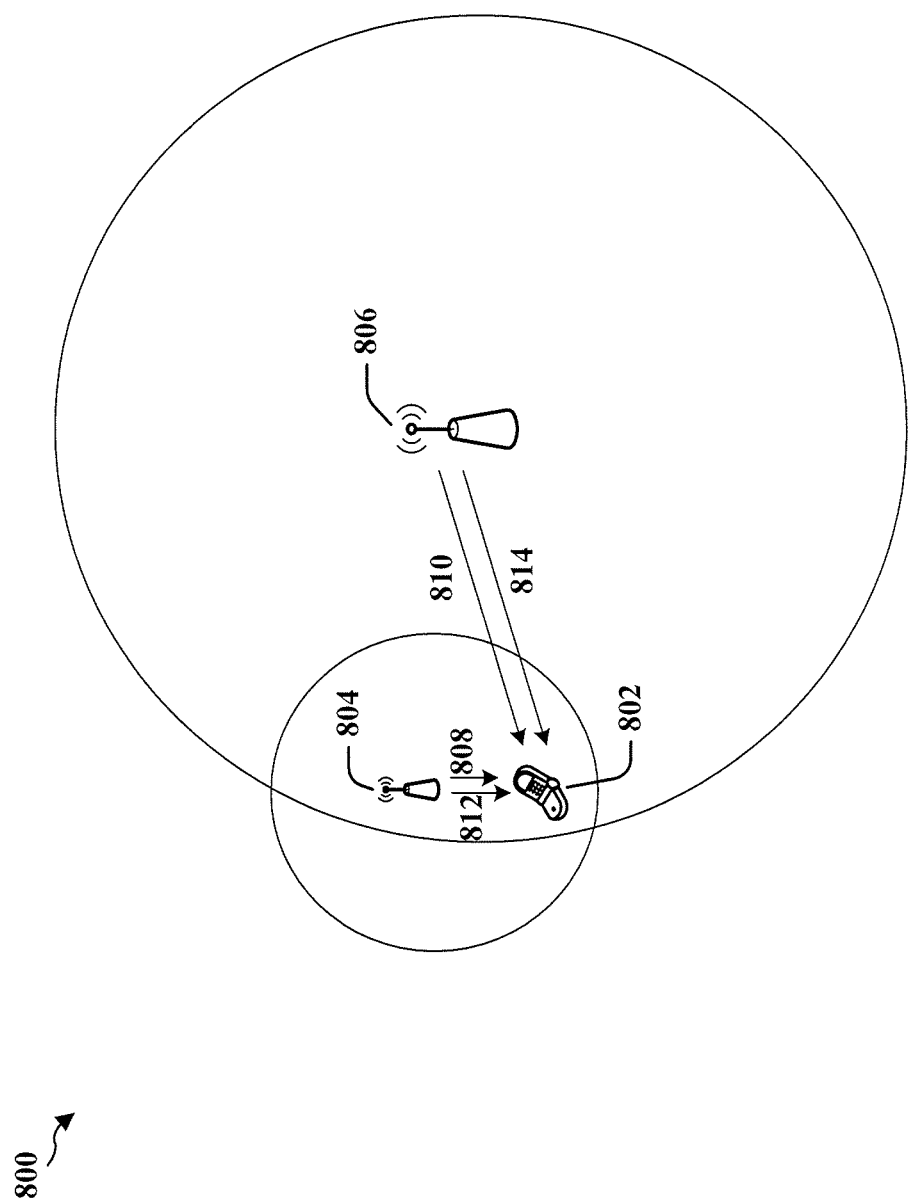
FIG. 8 is a diagram for illustrating an exemplary method.

FIG. 8 is a diagram 800 for illustrating an exemplary method. As shown in FIG. 8, the UE 802 receives control information 808 from a first cell 804. The control information 808 includes information for canceling interference due to a second cell signal 814 originating from a second cell 806. The first cell 804 may be a serving cell and the second cell 806 may be a neighboring cell. The UE 802 may receive a signal 812/814 that includes a first cell signal 812 and the second cell signal 814, wherein the first cell signal 812 originates from the first cell 804. Using blind detection in conjunction with the received control information 808, the UE 802 may cancel interference from the received signal 812/814 due to the second cell signal 814.

The second cell signal 814 may be any one of a number of physical channels and/or signals, such as a primary synchronization signal (PSS), a secondary synchronization signal (SSS), a physical broadcast channel (PBCH), a CRS, a demodulation reference signal (DRS), a channel state information reference signal (CSI-RS), a physical control format indicator channel (PCFICH), a physical hybrid automatic repeat request indicator channel (PHICH), a physical downlink control channel (PDCCH), a PDSCH, and the like. For simplicity in the discussion infra, it is assumed that the control information 808 is received in a PDCCH, the first cell signal 812 is a PDSCH, the second cell signal 814 is a PDSCH, and the signal 810, which schedules the PDSCH, is a PDCCH. The PDCCH 810 includes almost all of the information (does not include traffic to pilot ratio (TPR)) needed to cancel interference due to the second cell signal 814 from the signal 812/814. However, decoding the PDCCH 810 may not be feasible for the UE 802, and therefore the PDCCH 808 may provide some or all of the information the UE 802 needs to cancel the interference due to the second cell signal 814 from the signal 812/814.

The UE 802 may be configured to perform codeword-level interference cancelation (CWIC) and/or symbol level interference cancelation (SLIC). In CWIC, the UE 802 cancels interference due to the second cell signal 814 from the signal 812/814 by decoding the interfering data in the second cell signal 814 and canceling the decoded data from the signal 812/814. In SLIC, the UE 802 cancels interference due to the second cell signal 814 from the signal 812/814 by detecting modulation symbols in the second cell signal 814 and canceling the detected modulation symbols from the signal 812/814. For CWIC, the UE 802 needs to know a spatial scheme, a modulation and coding scheme (MCS), a resource block (RB) allocation, a redundancy version (RV), and the TPR associated with the second cell signal 814. For SLIC, the UE 802 needs to know the spatial scheme, the modulation order, the RB allocation, and the TPR associated with the second cell signal 814.

For non-unicast PDSCH transmissions, some parameters are fixed or known to the UE 802. For example, for non-unicast PDSCH transmission, the modulation order is QPSK, the spatial scheme is space frequency block code (SFBC) for 2Tx and SFBC-FSTD (frequency switched transmit diversity) for 4Tx, and the RV is known for system information block 1 (SIB1) PDSCH. Some of the parameters may be estimated. For example, the UE 802 may be able to estimate any one of the modulation order, the spatial scheme, the RB allocation (e.g., if there is only one interferer), and the TPR, but normally with some performance loss in the interference cancelation. Other parameters, such as the MCS and RV may be more difficult to estimate.

If the UE 802 performs CWIC, the control information 808 may include at least one of the spatial scheme, the MCS, the RB allocation, the RV, and the TPR associated with the second cell signal 814. The UE 802 may estimate the parameters needed for CWIC that are not included in the control information 808. If the UE 802 performs SLIC, the control information 808 may include at least one of the spatial scheme, the modulation order, the RB allocation, and the TPR associated with the second cell signal 814. The UE 802 may estimate the parameters needed for SLIC that are not included in the control information 808. For either CWIC or SLIC, the control information may further include a cell identifier of the second cell 806.

As described herein, aspects of the disclosure are related to identifying whether an apparatus (e.g., base station, access point, etc.) transmits using a CRS based transmission scheme or a UE-RS based transmission scheme. Such detection may be necessary for interference cancellation (IC) of a neighboring cell since a UE may not know which transmission scheme is used by the neighboring cell. For instance, the UE may know the transmission scheme of the serving cell, but the UE may not know the transmission scheme of a neighboring non-serving cell. As such, aspects of the disclosure provide for a blind detection algorithm to identify or determine a transmission mode or transmission scheme of a neighboring cell in order to apply interference cancellation (IC) to an interfering signal received from the neighboring cell. In an implementation, interference cancellation (IC) may include PDSCH IC. In other implementations, the CRS versus UE-RS detection scheme may be used in other scenarios not involving PDSCH IC or not involving multiple cells. Further, the detection techniques described herein may be based on a received signal. However, in reference to PDSCH IC, it should be noted that the detection techniques described herein may be based on the received signal minus an estimated serving cell signal. For instance, the serving cell signal may be cancelled, and the remaining signal is the received signal minus the serving cell signal.

Figure 9:
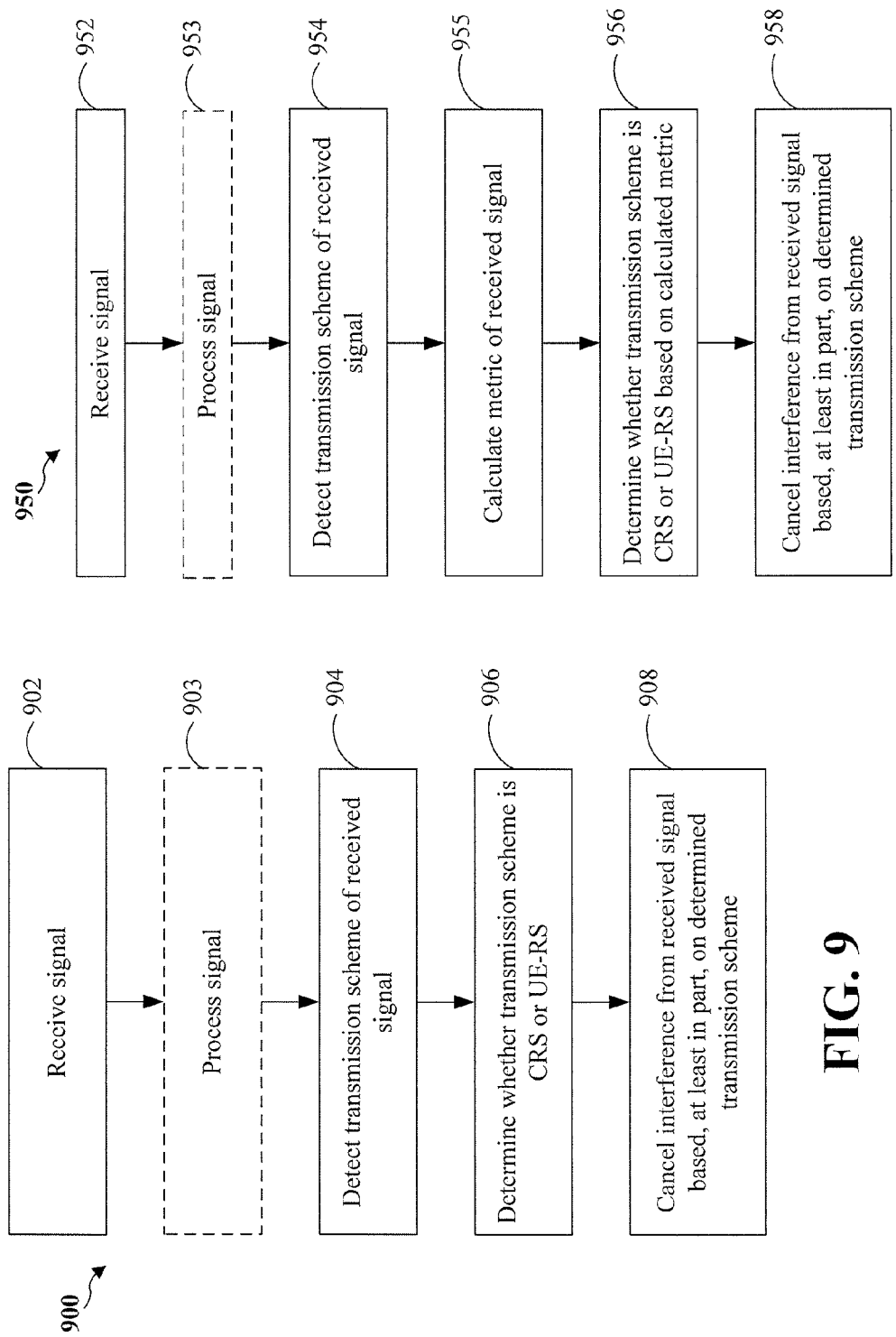
FIGS. 9-13 are diagrams illustrating methods for cancelling interference over wireless communications.

FIG. 9 is a diagram 900 illustrating a method of cancelling interference over wireless communications. The method may be performed by a UE capable of interference cancellation (IC) including PDSCH IC.

At 902, the UE receives a signal. The received signal includes a first cell signal from a first cell and a second cell signal from a second cell. In an implementation, the first cell may be a low power cell, and the second cell may be a high power cell. The first cell may be a serving cell, and the second cell may be a non-serving cell. For example, the first cell may be a pico cell, femto cell, relay, remote radio head, etc. The received signal may include a PDSCH from the first cell, and a PDSCH from the second cell.

At 903, the UE may process the received signal prior to detecting a transmission scheme of the signal. For example, a minimum mean square error (MMSE) operation may be performed on the received signal. By performing such process, UE detection performance may be enhanced. However, processing the received signal increases system complexity. As such, when reduced system complexity is desired, the UE will not process the received signal prior to detecting the transmission scheme of the signal.

At 904, the UE detects a transmission scheme of the second cell signal. Techniques for detecting the transmission scheme are based on the received signal. The detection techniques provide for a blind detection algorithm, as described in greater detail herein, to detect a transmission scheme of a neighboring cell (e.g., the second cell). As described herein, interference cancellation may be applied to an interfering signal received from the neighboring cell. In reference to PDSCH, the detection techniques may be based on the received signal minus an estimated serving cell signal. For instance, the serving cell signal may be cancelled, and the remaining signal is the received signal minus the serving cell signal.

At 906, the UE determines whether the transmission scheme is a CRS based transmission scheme or a UE-RS based transmission scheme. The UE determines whether an apparatus (e.g., base station, access point, etc.) transmits using a CRS based transmission scheme or a UE-RS based transmission scheme using various techniques as provided in FIGS. 10-13, for example.

At 908, the UE cancels interference from the received signal due to the second cell signal based, at least in part, on the determined transmission scheme. The UE uses detection and determination techniques for PDSCH IC of a neighboring cell since the UE may not know the transmission scheme used by the neighboring cell. Although the UE may know the transmission scheme of the serving cell, the UE may not know the transmission scheme of a neighboring non-serving cell. Accordingly, the UE utilizes blind detection to determine a transmission mode scheme of a neighboring cell in order to apply PDSCH IC to an interfering signal received from the neighboring cell.

FIG. 9A is a diagram 950 illustrating a method of cancelling interference over wireless communications. As with FIG. 9, the method may be performed by a UE capable of interference cancellation (IC) including PDSCH IC.

At 952, the UE receives a signal. The received signal includes a first cell signal from a first cell and a second cell signal from a second cell. In an implementation, the first cell may be a low power cell, and the second cell may be a high power cell. The first cell may be a serving cell, and the second cell may be a non-serving cell. For example, the first cell may be a pico cell, femto cell, relay, remote radio head, etc. The received signal may include a PDSCH from the first cell, and a PDSCH from the second cell.

At 953, the UE may process the received signal prior to detecting a transmission scheme of the signal. For example, a minimum mean square error (MMSE) operation may be performed on the received signal. By performing such process, UE detection performance may be enhanced. However, processing the received signal increases system complexity. As such, when reduced system complexity is desired, the UE will not process the received signal prior to detecting the transmission scheme of the signal.

At 954, the UE detects a transmission scheme of the second cell signal. Techniques for detecting the transmission scheme are based on the received signal. The detection techniques provide for a blind detection algorithm, to detect a transmission scheme of a neighboring cell (e.g., the second cell). Interference cancellation may be applied to an interfering signal received from the neighboring cell.

At 955, the UE calculates a metric of the received signal. The metric may be calculated based on the received signal on UE-RS tone locations (e.g., see FIG. 3). Examples of the metric include a power metric and an SNR metric. In various implementations, the metric may be a function of the received signal on UE-RS tones, allowed spreading and scrambling sequences, and/or determined rank or possible ranks. The rank may be determined prior to calculating the metric, such as using data tones of the received signal. The metric may consider a multiple rank hypothesis. Also, the metric may be different in systems that support and do not support UE-RS port 5.

At 956, the UE determines whether the transmission scheme is a CRS based transmission scheme or a UE-RS based transmission scheme based on the calculated metric. Specifically, the UE determines whether an apparatus (e.g., base station, access point, etc.) transmits using a CRS based transmission scheme or a UE-RS based transmission scheme based on the calculated metric.

At 958, the UE cancels interference from the received signal due to the second cell signal based, at least in part, on the determined transmission scheme. Hence, the UE utilizes blind detection to determine a transmission mode scheme of a neighboring cell in order to apply interference cancellation (including PDSCH IC) to an interfering signal received from the neighboring cell.

Figure 10:
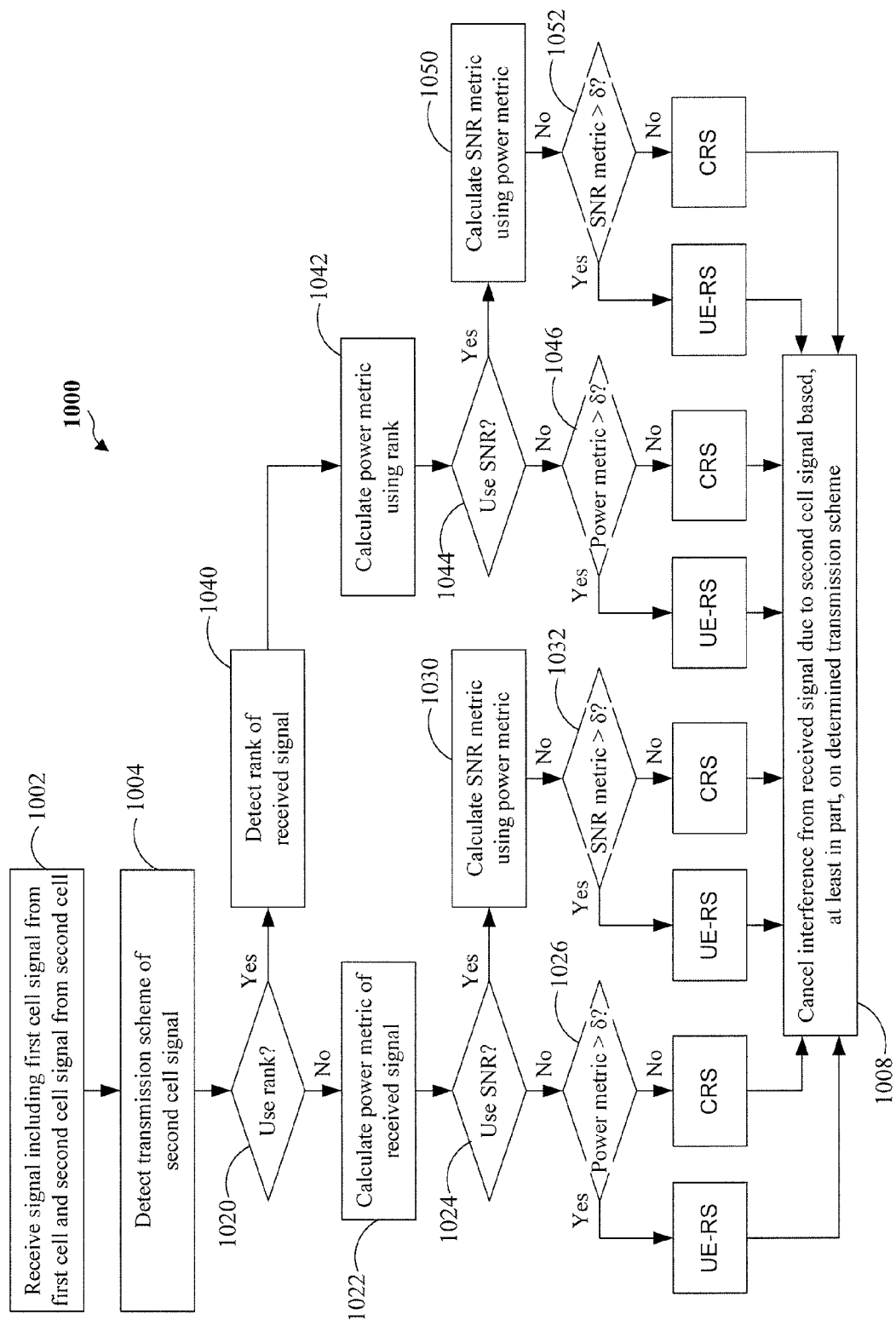

FIG. 10 is a diagram 1000 illustrating a method of cancelling interference over wireless communications using a power metric. The method includes using one or more parameters to determine whether the transmission scheme is a CRS based transmission scheme or a UE-RS based transmission scheme. The method may be performed by a UE or other device receiving transmissions from the eNB.

At 1002, the device receives a signal. The received signal includes a first cell signal from a first cell and a second cell signal from a second cell. In an implementation, the first cell may be a low power cell, and the second cell may be a high power cell. The first cell may be a serving cell, and the second cell may be a non-serving cell. For example, the first cell may be a pico cell, femto cell, relay, remote radio head, etc. The received signal may include a PDSCH from the first cell, and a PDSCH from the second cell.

At 1004, the device detects a transmission scheme of the second cell signal. At 1020, the device determines whether to use a rank of the received signal for determining the transmission scheme. If not, the device may proceed to step 1022. Otherwise, the device proceeds to step 1040.

At 1022, the device calculates a power metric of the received signal. At 1024, the device determines whether to use a signal-to-noise (SNR) metric for determining the transmission scheme. If not, the device may proceed to step 1026. Otherwise, the device proceeds to step 1030.

At 1026, the device determines the transmission scheme based on a threshold related to the power metric. For example, if the power metric is greater than a threshold δ, then the device determines that the transmission scheme is the UE-RS based transmission scheme. In another example, if the power metric is less than or equal to the threshold δ, then the device determines that the transmission scheme is the CRS based transmission scheme.

At 1030, the device calculates the SNR metric using the calculated power metric. At 1032, the device determines the transmission scheme based on a threshold related to the SNR metric. For example, if the SNR metric is greater than a threshold δ, then the device determines that the transmission scheme is the UE-RS based transmission scheme. In another example, if the SNR metric is less than or equal to the threshold δ, then the device determines that the transmission scheme is the CRS based transmission scheme.

At 1040, the device detects a rank associated with the received signal by measuring a covariance on a data portion of the received signal. At 1042, the device calculates a power metric of the received signal using the rank (e.g., information related to the detected rank of the received signal).

At 1044, the device determines whether to use SNR of the calculated power metric for determining the transmission scheme. If not, the device may proceed to step 1046. Otherwise, the device proceeds to step 1050.

At 1046, the device determines the transmission scheme based on a threshold. For example, if the power metric is greater than a threshold δ, then the device determines that the transmission scheme is the UE-RS based transmission scheme. In another example, if the power metric is less than or equal to the threshold δ, then the device determines that the transmission scheme is the CRS based transmission scheme.

At 1050, the device calculates the SNR metric using the calculated power metric that was calculated using the rank. At 1052, the device determines the transmission scheme based on a threshold related to the SNR metric. For example, if the SNR metric is greater than a threshold δ, then the device determines that the transmission scheme is the UE-RS based transmission scheme. In another example, if the SNR metric is less than or equal to the threshold δ, then the device determines that the transmission scheme is the CRS based transmission scheme.

At 1008, after determining the transmission scheme, the device may cancel interference from the received signal due to the second cell signal based, at least in part, on the determined transmission scheme.

In accordance with aspects of the disclosure, transmission scheme detection involves measuring a covariance of the received signal by using a y=12×2 matrix of the received signal. Let $y_i$ for i=0, 1 be the received signal for antenna 0 and 1, and therefore, $y=[y_0\ y_1]$. The UE-RS sequence is 12×1, where each element is unit norm. Two sets of sequences for two scrambling sequences may be represented as:

$$SCID=0:\ S1a, S2a; \qquad (1)$$

and $$SCID=1:\ S1b, S2b, \qquad (2)$$

wherein 1 and 2 correspond to two code division multiplexed (CDM) codes that are orthogonally multiplexed.

If rank information is not used, an algorithm used for calculating the power metric is as shown below:

$$\text{Power metric} = \max((|S1a^*y_i|^2 + |S2a^*y_i|^2, |S1b^*y_i|^2 + |S2b^*y_i|^2)/\|y_i\|^2. \qquad (3)$$

If rank information is used, then rank detection is applied, for example, by measuring a covariance on a data portion of the received signal.

If Rank=1 is detected, then:

$$\text{Power metric} = \max((|S1a^*y_i|^2, |S2a^*y_i|^2, |S1b^*y_i|, |S2b^*y_i|^1)/\|y_i\|^2. \qquad (4)$$

If Rank=2 is detected, then:

$$\text{Power metric} = \max((|S1a^*y_i|^2 + |S2a^*y_i|^2, |S1b^*y_i|^2 + |S2b^*y_i|^2)/\|y_i\|^2. \qquad (5)$$

After calculating the power metric, a decision rule is applied to determine the transmission scheme, wherein:

$$\text{Decision rule: If power metric>threshold, then UE-RS else CRS.} \qquad (6)$$

In the equations (3)-(5) above, "*" refers to an inner product between two vectors. Moreover, $\|y_i\|^2$ is defined as a sum of norm of all elements in $y_i$. For time division duplex (TDD), another power metric may be calculated for UE-RS port 5 in the above max functions.

In accordance with aspects of the disclosure, other metrics may be considered, such as an SNR metric, to determine the transmission scheme of the received signal.

If rank information is not used, an algorithm used for calculating the power metric and the SNR metric without rank information is as shown below:

$$\text{Power}_i = \max(|S1a^*y_i|^2 + |S2a^*y_i|^2, |S1b^*y_i|^2 + |S2b^*y_i|^2)/12; \qquad (7)$$

and $$\text{SNR metric} = \text{sum over } i(\text{Power}_i/(\|y_i\|^2 - \text{Power})). \qquad (8)$$

If rank information is used, then rank detection is applied, for example, by measuring a covariance on a data portion of the received signal.

If Rank=1 is detected, then:

$$\text{Power}_i = \max(|S1a^*y_i|^2, |S2a^*y_i|^2, |S1b^*y_i|^2, |S2b^*y_i|^2)/12; \qquad (9)$$

and $$\text{SNR metric} = \text{sum over } i(\text{Power}_i/(\|y_i\|^2 - \text{Power})). \qquad (10)$$

If Rank=2 is detected, then:

$$\text{Power}_i = \max(|S1a^*y_i|^2 + |S2a^*y_i|^2, |S1b^*y_i|^2 + |S2b^*y_i|^2)/12; \qquad (11)$$

and $$\text{SNR metric} = \text{sum over } i(\text{Power}_i/(\|y_i\|^2 - \text{Power})). \qquad (12)$$

In the equations (7)-(12) above, "i" represents a receive antenna index.

After calculating the power metric and the SNR metric, a decision rule is applied to determine the transmission scheme, wherein:

$$\text{Decision rule: If SNR metric>threshold, then UE-RS else CRS.} \qquad (13)$$

It may be assumed that only the DC component includes most of the signal power. However, projections may be taken along other directions.

For instance, $$\text{Power}_i = \max(\text{sum}_k|a_k^*y_i|^2, \text{sum}_k|b_k^*y_i|^2)/12; \qquad (14)$$

and $$\text{SNR metric} = \text{sum over } i(\text{Power}_i/(\|y_i\|^2 - \text{Power})). \qquad (15)$$

In accordance with aspects of the disclosure, approaches to detecting the CRS/UE-RS transmission schemes may be based on UE-RS power in a manner as previously described. For TDD, UE-RS port 5 may also be considered.

Figure 11:
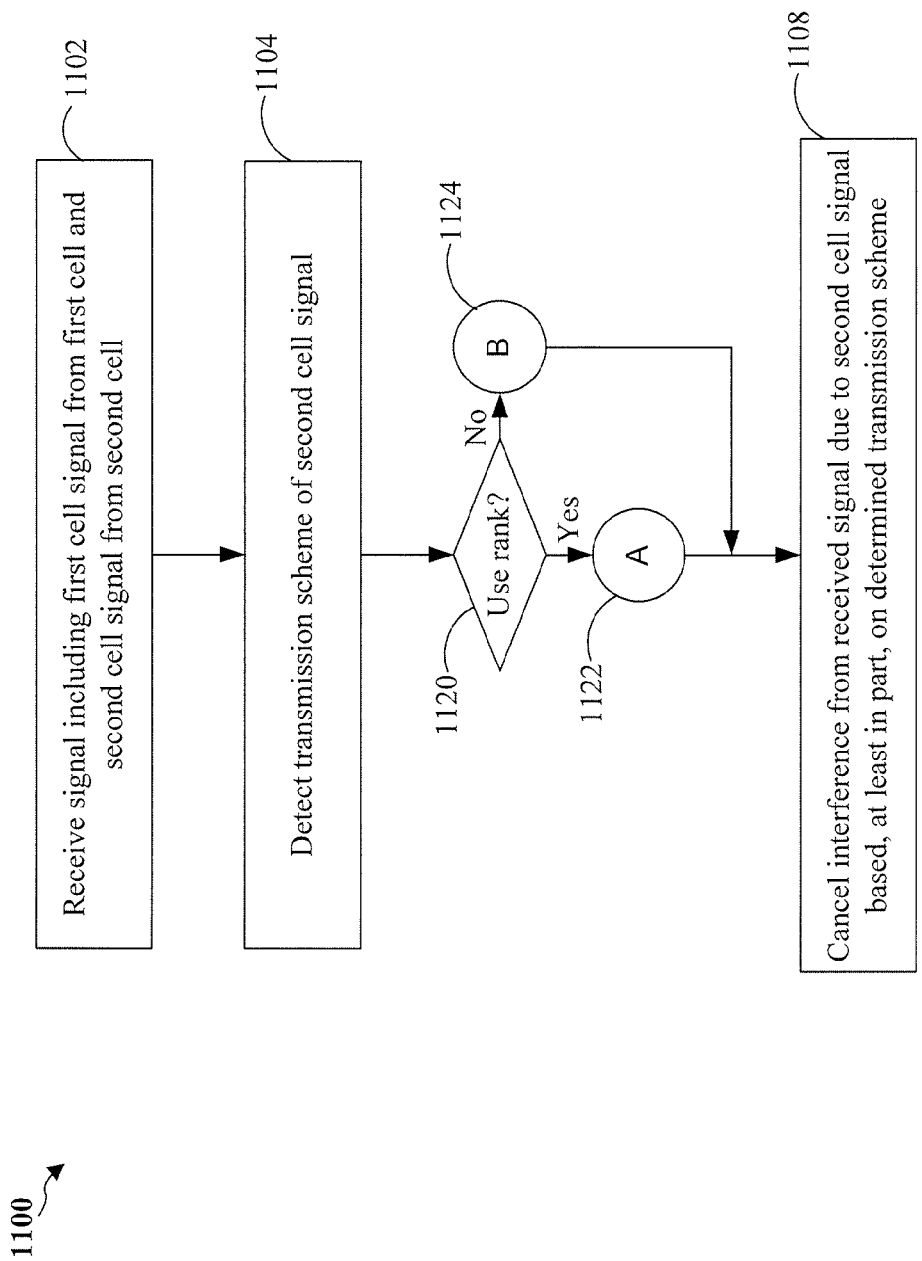

FIG. 11 is a diagram 1100 illustrating a method of cancelling interference over wireless communications. The method includes using one or more parameters to determine whether the transmission scheme is a CRS based transmission scheme or a UE-RS based transmission scheme. The method may be performed by a UE or other device receiving transmissions from the eNB.

At 1102, the device receives a signal, wherein the received signal includes a first cell signal from a first cell and a second cell signal from a second cell. In an implementation, the first cell may be a low power cell, and the second cell may be a high power cell. The first cell may be a serving cell, and the second cell may be a non-serving cell. For example, the first cell may be a pico cell, femto cell, relay, remote radio head, etc. The received signal may include a PDSCH from the first cell, and a PDSCH from the second cell.

At 1104, the device detects a transmission scheme of the second cell signal. At 1120, the device determines whether to use a rank of the received signal for determining the transmission scheme. If so, the device may proceed to step 1122. Otherwise, the device proceeds to step 1124. It should be appreciated that step 1120 is optional, and accordingly, the device may execute A only, B only, or execute A and B inline based on their results.

Figure 12:
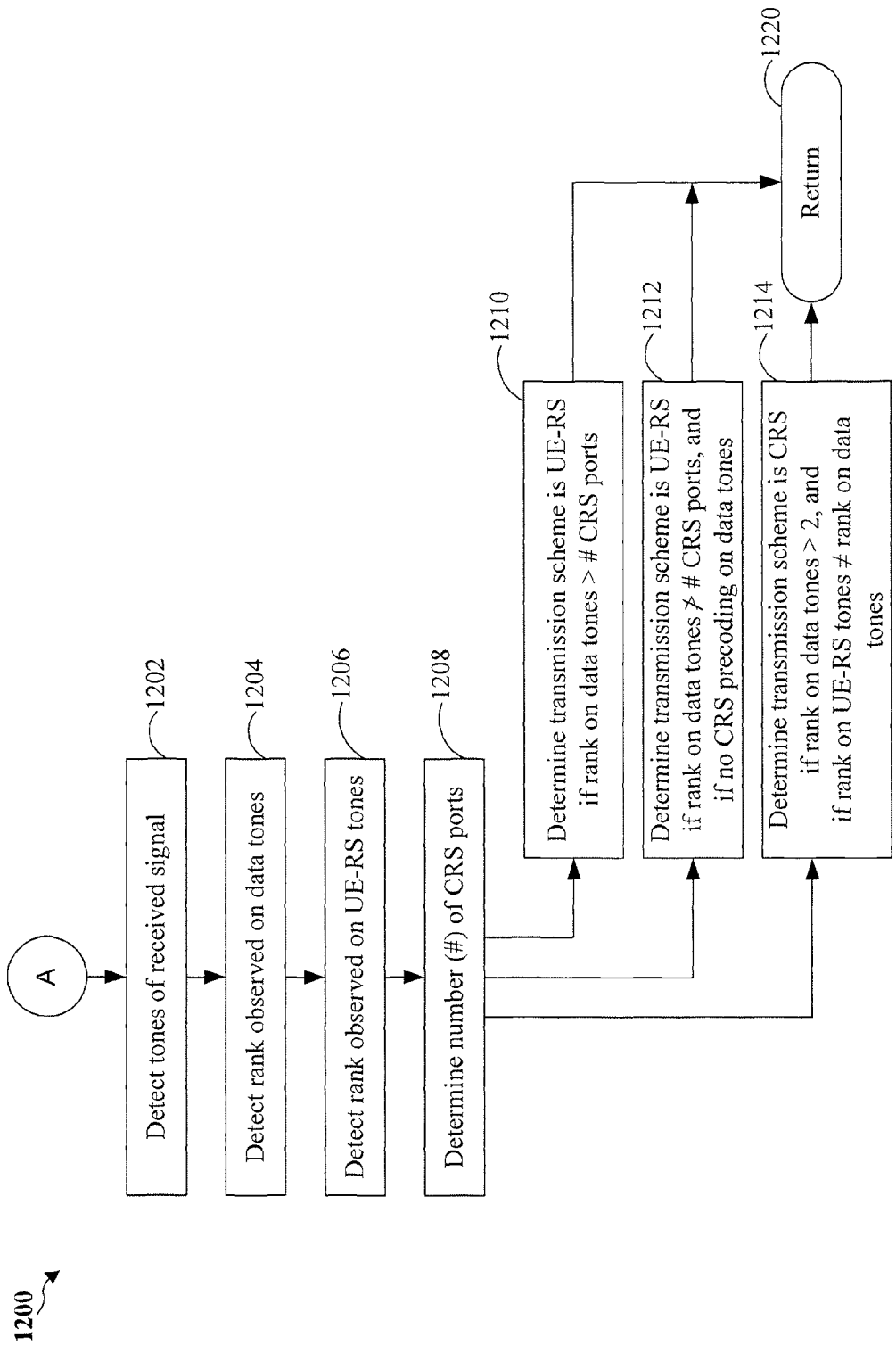

At 1122, the device proceeds to perform the steps shown in FIG. 12. At 1124, the device proceeds to perform the steps shown in FIG. 13. Upon return from the method 1200 of FIG. 12, or the method 1300 of FIG. 13, at 1108, the device cancels interference from the received signal due to the second cell signal based, at least in part, on the determined transmission scheme.

FIG. 12 is a diagram 1200 illustrating a method of determining the transmission scheme. The method may be performed by a UE or other device receiving transmissions from the eNB.

At 1202, the device detects tones of the received signal. At 1204, the device detects a rank observed on data tones of the received signal. At 1206, the device detects a rank observed on UE-RS tones of the received signal. At 1208, the device determines a number of CRS ports.

In an implementation, after detecting the rank observed on the data tones and after determining the number of CRS ports, at 1210, the device determines that the transmission scheme is the UE-RS based transmission scheme if the rank observed on the data tones is larger than the number of CRS ports.

In another implementation, after detecting the rank observed on the data tones and after determining the number of CRS ports, at 1212, the device determines that the transmission scheme is the UE-RS based transmission scheme if the rank observed on the data tones does not exceed the number of CRS ports, and no CRS precoding leads to the observed covariance matrix on the data tones.

In another implementation, after detecting the rank observed on the data tones and after detecting the rank observed on the UE-RS tones, at 1214, the device determines that the transmission scheme is the CRS based transmission scheme if the rank observed on the data tones is larger than 2, and the rank observed on the UE-RS tones is not equal to the rank observed on the data tones.

After determining the transmission scheme, the method of FIG. 12 returns 1220 to the method of FIG. 11 to proceed at 1108.

In an aspect of the disclosure, referring to FIG. 12, determining the transmission scheme may be based on the rank observed on the data tones of the received signal.

For instance,
if Rank>＃CRS, the transmission scheme is UE-RS based;
if Rank≤＃CRS, check if any CRS precoding leads to the same Ryy (i.e., a covariance matrix on data tones), if not, the transmission scheme is UE-RS based; and
if Rank=3 or 4, check if rank on the UE-RS tones is less than the rank on the data tones. Since UE-RS for Rank>2 is split into two different CDM groups, the rank on the UE-RS tones is less than the rank on the data tones. For CRS, the rank on the UE-RS tones and the data tones may be the same.

Figure 13:
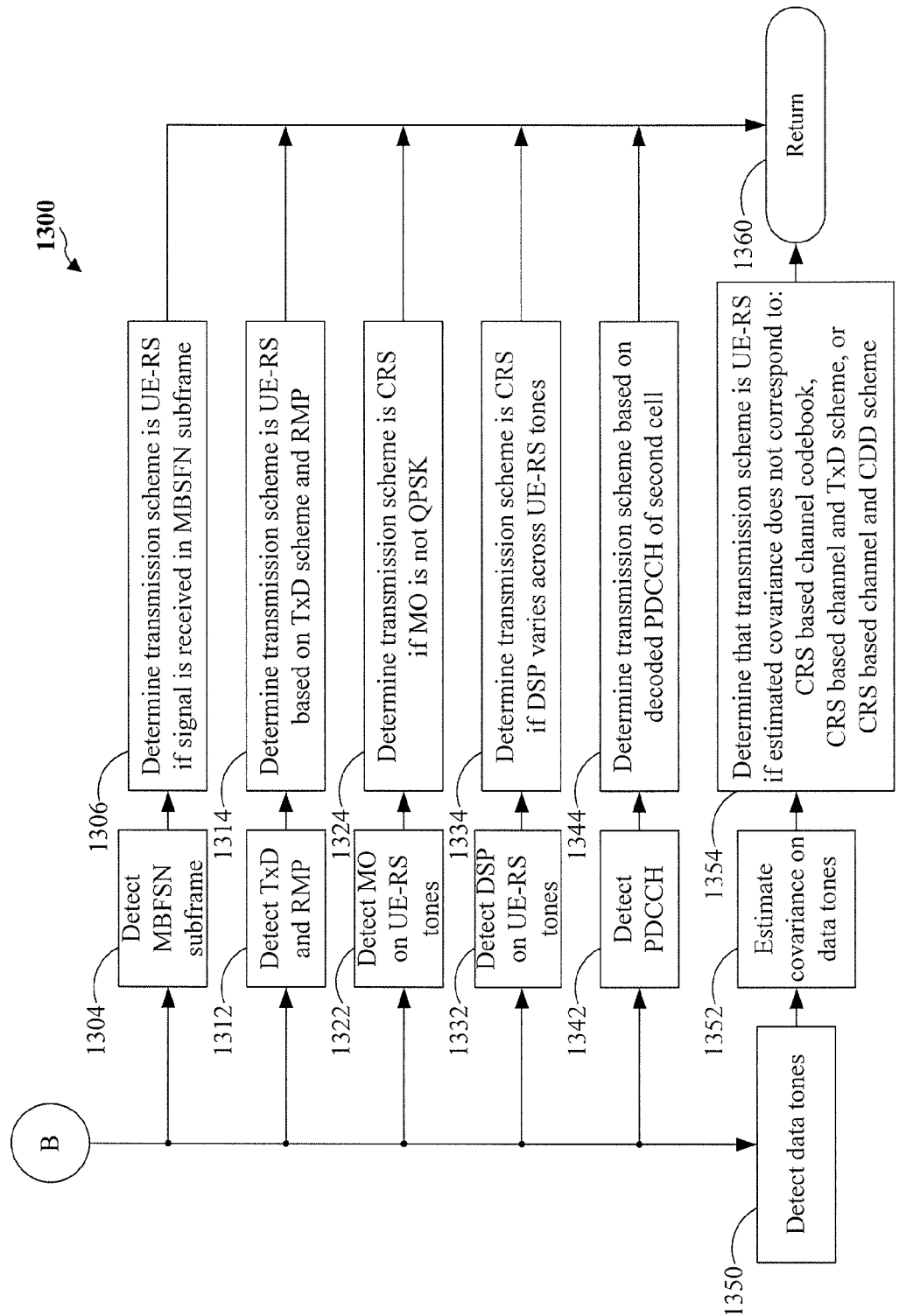

FIG. 13 is a diagram 1300 illustrating alternative methods for determining the transmission scheme. It should be appreciated that the following methods may be in any order, and each method may be selected independent of the other.

Referring to FIG. 13, the method may include detecting whether the signal is received in an MBSFN subframe. The method may be performed by a UE or other device receiving transmissions from the eNB.

At 1304, the UE may detect the MSFBN subframe. At 1306, the UE may determine that the transmission scheme is the UE-RS based transmission scheme when the signal is detected as being received in an MBSFN subframe. After determining the transmission scheme, the method of FIG. 13 returns 1360 to the method of FIG. 11 to proceed at 1108.

In an aspect of the disclosure, referring to FIG. 13, determining the transmission scheme may be based on MBSFN configuration of neighboring cells. For instance, if a neighboring cell is detected as MBSFN, then the neighboring cell may only transmit data using UE-RS on those subframes. However, the UE may not know the MBSFN configuration of the neighboring cell, and the UE may then have to have some MBSFN detection scheme to achieve MBSFN detection.

Referring to FIG. 13, the method may include determining whether to detect a transmit diversity (TxD) scheme of the received signal. At 1312, the UE may detect the TxD scheme of the received signal and detecting a rate-matching pattern (RMP) of the received signal. At 1314, the UE may determine that the transmission scheme is the UE-RS based transmission scheme based on an appearance of the TxD scheme and the RMP. After determining the transmission scheme, the method of FIG. 13 returns 1360 to the method of FIG. 11 to proceed at 1108.

In an aspect of the disclosure, referring to FIG. 13, if the UE knows or detects that a subframe corresponds to a subframe that has CSI-RS or muting, the UE may be able to detect that an SFBC/SFBC-FSTD scheme is used. There are certain configurations of CSI-RS and muting patterns for which the eNB has to rate match around the symbols containing CSI-RS and/or mute when the eNB uses transmit diversity schemes (TxD) such as SFBC/SFBC-FSTD. Here, SFBC refers to space frequency block code, and FSTD refers to frequency shift time diversity. These are not skipped for other CRS based transmissions and UE-RS based transmissions. Accordingly, the UE may measure the PDSCH power on different resource elements (REs) and determine if some REs were used for data transmission or not. If the UE discovers that the REs corresponding to the TxD scheme were not used, then the UE may attribute this to use of the TxD scheme.

Referring to FIG. 13, the method may include determining whether to detect a modulation order (MO) of the received signal. At 1322, the UE may detect the modulation order on UE-RS tones of the received signal. At 1324, the UE may determine that the transmission scheme is the CRS based transmission scheme if the MO is not QPSK. After determining the transmission scheme, the method of FIG. 13 returns 1360 to the method of FIG. 11 to proceed at 1108.

Referring to FIG. 13, the method may include determining whether to detect a data signal power (DSP) of the received signal. At 1332, the UE may detect the data symbol power (DSP) on UE-RS tones of the received signal. At 1334, the UE may determine that the transmission scheme is the CRS based transmission scheme if data symbol power (DSP) varies across the UE-RS tones of the received signal. After determining the transmission scheme, the method of FIG. 13 returns 1360 to the method of FIG. 11 to proceed at 1108.

In an aspect of the disclosure, referring to FIG. 13, determining the transmission scheme may be based on modulation order (MO) on the UE-RS tones of the received signal. For instance, if it is determined that the modulation order (MO) on UE-RS tones is not QPSK, or the data symbol power (DSP) varies across the UE-RS tones indicating a data transmission which does not have norm of 1 on all tones, it is likely to be CRS, since the UE-RS pilots are norm 1.

Referring to FIG. 13, the method may include determining whether to detect a physical downlink control channel (PDCCH) of the received signal. At 1342, the UE may decode the PDCCH of the second cell. At 1344, the UE may determine the transmission scheme based on the decoded PDCCH of the second cell. After determining the transmission scheme, the method of FIG. 13 returns 1360 to the method of FIG. 11 to proceed at 1108.

In an aspect of the disclosure, referring to FIG. 13, determining the transmission scheme may be based on decoding a neighbor cell PDCCH. Referring to FIG. 13, at 1350, the UE may detect data tones of the received signal. At 1352, the UE may estimate covariance on the data tones of the received signal. At 1354, the UE may determine that the transmission scheme is the UE-RS based transmission scheme if the estimated covariance does not correspond to at least one of a CRS based channel codebook, a CRS based channel and transmit diversity scheme, and a CRS based channel and cyclic delay diversity scheme. After determining the transmission scheme, the method of FIG. 13 returns 1360 to the method of FIG. 11 to proceed at 1108.

In an aspect of the disclosure, referring to FIG. 13, determining the transmission scheme may be based on Precoding/Tx Scheme detection. For instance, the Ryy (i.e., covariance matrix) on the data tones may be estimated, and if the Ryy does not correspond to at least one of a CRS based channel allowed codebook, a CRS based channel and TxD scheme, and a CRS based channel and LD-CDD scheme, then the UE determines that the transmission scheme is UE-RS based.

Figure 14:
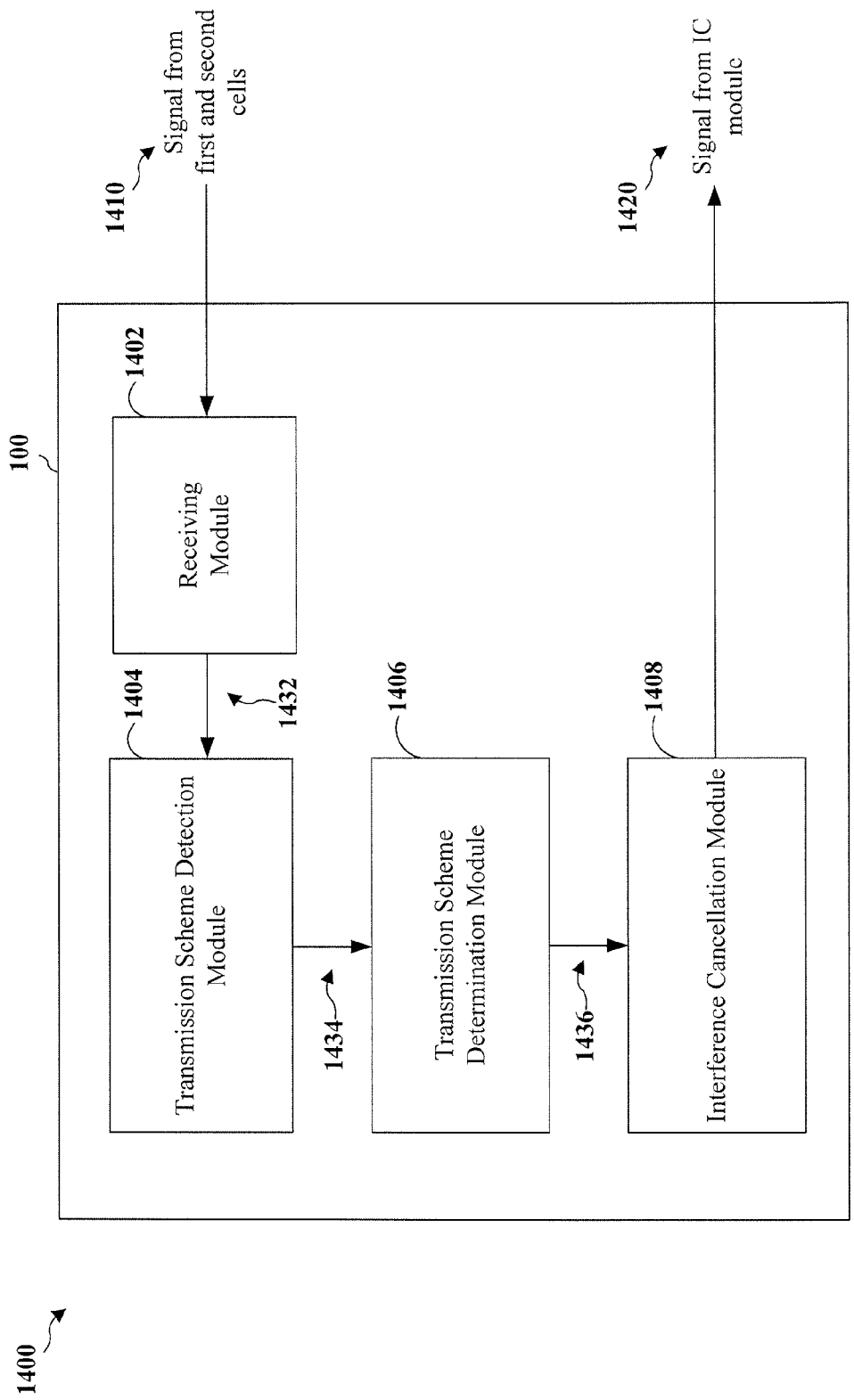
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 100. The apparatus 100 includes a receiving module 1402 that receives an input signal 1410 from the first and second cells. The input signal 1410 may include a first cell signal from a first cell and a second cell signal from a second cell. In an implementation, the first cell may be a low power cell, and the second cell may be a high power cell. The first cell may be a serving cell, and the second cell may be a non-serving cell. For example, the first cell may be a pico cell, femto cell, relay, remote radio head, etc. The input signal may include a PDSCH from the first cell, and a PDSCH from the second cell. The receiving module 1402 also provides a signal 1432 related to the received signal.

The apparatus 100 includes a transmission scheme detection module 1404 that receives the signal 1432 and detects a transmission scheme of the second cell signal. The transmission scheme detection module 1404 also provides a signal 1434 related to the detected transmission scheme of the received signal.

The apparatus 100 includes a transmission scheme determination module 1406 that receives the signal 1434 and determines whether the transmission scheme is a CRS based transmission scheme or a UE-RS based transmission scheme. The transmission scheme determination module 1406 may also calculate a metric based on the received signal 1434 and determine whether the transmission scheme is a CRS based transmission scheme or a UE-RS based transmission scheme according to the calculated metric. The transmission scheme determination module 1406 also provides a signal 1436 related to the determined transmission scheme of the received signal.

The apparatus 100 includes an interference cancellation module 1408 that receives the signal 1436 and cancels interference from the received signal due to the second cell signal based, at least in part, on the determined transmission scheme. The interference cancellation module 1408 also provides an output signal 1420 related to the cancelled interference from the received signal.

The apparatus may include additional modules that perform each of the steps of the algorithms in the aforementioned flow charts of FIGS. 10-13. As such, each step in the aforementioned flow charts of FIGS. 10-13 may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
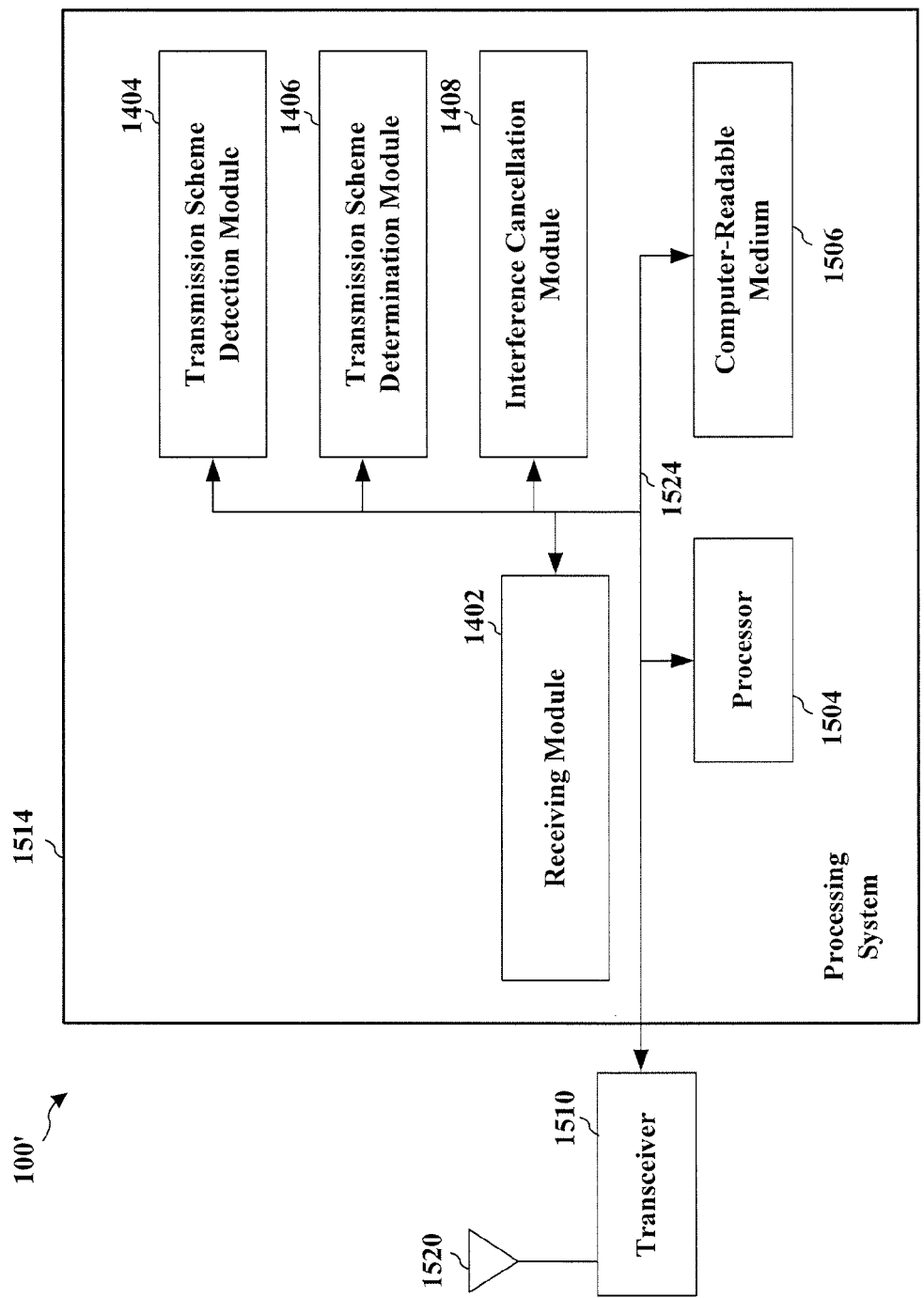
FIG. 15 is a diagram illustrating an example of a hardware implementation for an apparatus employing a processing system.

FIG. 15 is a diagram illustrating an example of a hardware implementation for an apparatus 100' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1402, 1404, 1406, 1408, and the computer-readable medium 1506. The bus 1524 may also link various other circuits such as timing sources, peripherals, voltage regulators, and power management circuits, which are well known in the art, and therefore, will not be described any further.

The apparatus includes a processing system 1514 coupled to a transceiver 1510. The transceiver 1510 is coupled to one or more antennas 1520. The transceiver 1510 provides a means for communicating with various other apparatus over a transmission medium. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes modules 1402, 1404, 1406, and 1408. The modules may be software modules running in the processor 1504, resident/stored in the computer readable medium 1506, one or more hardware modules coupled to the processor 1504, or some combination thereof. In an implementation, the processing system 1514 may be a component of user equipment (UE) and may include the memory 660 and/or at least one of the TX processor 668, the RX processor 656, and the controller/processor 659.

In one configuration, the apparatus 100/100' for wireless communication includes means for receiving a signal, wherein the received signal includes a first cell signal from a first cell and a second cell signal from a second cell, means for detecting a transmission scheme of the second cell signal, means for determining whether the transmission scheme comprises a CRS based transmission scheme or a UE-RS based transmission scheme, and means for cancelling interference from the received signal due to the second cell signal based, at least in part, on the determined transmission scheme.

The aforementioned means may be one or more of the aforementioned modules of the apparatus 100 and/or the processing system 1514 of the apparatus 100' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication, comprising:
   receiving a signal, the signal including at least a first cell signal from a first cell;
   determining a transmission scheme associated with the received signal, the determined transmission scheme being one of a common reference signal (CRS) based transmission scheme or a user equipment reference signal (UE-RS) based transmission scheme, wherein the determining the transmission scheme comprises
      determining that the transmission scheme includes the UE-RS based transmission scheme if a power metric is greater than a threshold, and
      determining that the transmission scheme includes the CRS based transmission scheme if the power metric is less than or equal to the threshold, and
   processing the received signal based, at least in part, on the determined transmission scheme.

2. The method of claim 1, wherein the processing the received signal comprises canceling interference from the received signal due to a second cell signal from a second cell based, at least in part, on the determined transmission scheme.

3. The method of claim 1, further comprising calculating the power metric of the received signal.

4. The method of claim 1, further comprising detecting a rank associated with the received signal by at least measuring a covariance on a data portion of the received signal, the power metric being based at least on the rank.

5. A method for wireless communication, comprising:
   receiving a signal, the signal including at least a first cell signal from a first cell;
   deciding whether to use a rank associated with the received signal to determine a transmission scheme associated with the received signal;
   determining the transmission scheme; and
   processing the received signal based, at least in part, on the determined transmission scheme,
   wherein when the rank is used to determine the transmission scheme, the method further comprises:
      detecting one or more ranks associated with the received signal; and
      determining a number of common reference signal (CRS) ports,
      wherein the transmission scheme is determined to include a CRS based transmission scheme or a user equipment reference signal (UE-RS) based transmission scheme based, at least in part, on the one or more ranks associated with the received signal and the number of CRS ports.

6. The method of claim 5, wherein the processing the received signal comprises canceling interference from the received signal due to a second cell signal from a second cell based, at least in part, on the determined transmission scheme.

7. The method of claim 5,
   wherein the one or more ranks associated with the received signal comprises a rank observed on data tones of the received signal and a rank observed on UE-RS tones of the received signal, and
   wherein the determining the transmission scheme comprises:
      determining that the transmission scheme includes the UE-RS based transmission scheme if the rank observed on the data tones is larger than the number of the CRS ports, determining that the transmission scheme includes the UE-RS based transmission scheme if the rank observed on the data tones does not exceed the number of the CRS ports, and no CRS precoding leads to an observed covariance matrix on the data tones, and determining that the transmission scheme includes the CRS based transmission scheme if the rank observed on the data tones is larger than 2 and the rank observed on the UE-RS tones is not equal to the rank observed on the data tones.

8. The method of claim 5, wherein when the rank is not used to determine the transmission scheme, the method further comprises detecting at least one of:
whether the signal is received in a multimedia broadcast over a single frequency network (MBSFN) subframe,
a transmit diversity scheme of the received signal,
a modulation order on UE-RS tones of the received signal,
a data symbol power on UE-RS tones of the received signal,
data tones of the received signal, or
a physical downlink control channel (PDCCH) of a second cell.

9. The method of claim 8, wherein when the signal is detected as being received in the MBSFN subframe, the determining the transmission scheme includes identifying the transmission scheme as the UE-RS based transmission scheme.

10. The method of claim 8, wherein when the transmit diversity scheme of the received signal is detected, the method further comprises detecting a rate-matching pattern of the received signal; and
the determining the transmission scheme includes identifying that the transmission scheme is the UE-RS based transmission scheme based on an appearance of the transmit diversity scheme and the rate-matching pattern.

11. The method of claim 8, wherein when the modulation order on UE-RS tones of the received signal is detected, the determining the transmission scheme includes identifying that the transmission scheme is the CRS based transmission scheme if the modulation order is not quadrature phase shift keying (QPSK).

12. The method of claim 8, wherein when the data symbol power on UE-RS tones of the received signal is detected, the determining the transmission scheme includes identifying that the transmission scheme is the CRS based transmission scheme if the data symbol power varies across the UE-RS tones.

13. The method of claim 8, wherein when the data tones of the received signal are detected, the method further comprises estimating covariance on the data tones of the received signal; and
the determining the transmission scheme includes identifying that the transmission scheme is the UE-RS based transmission scheme if the estimated covariance does not correspond to at least one of a CRS based channel codebook, a CRS based channel and transmit diversity scheme, or a CRS based channel and cyclic delay diversity scheme.

14. The method of claim 8, wherein when the PDCCH of the second cell is detected, the method further comprises decoding the PDCCH of the second cell; and
the determining the transmission scheme includes identifying the transmission scheme based on the decoded PDCCH of the second cell.

15. An apparatus for wireless communication, comprising:
a memory; and
at least one processor coupled to the memory and configured to:
receive a signal, the signal including at least a first cell signal from a first cell,
determine a transmission scheme associated with the received signal, the determined transmission scheme being one of a common reference signal (CRS) based transmission scheme or a user equipment reference signal (UE-RS) based transmission scheme, wherein the at least one processor is configured to determine the transmission scheme by
determining that the transmission scheme includes the UE-RS based transmission scheme if a power metric is greater than a threshold, and
determining that the transmission scheme includes the CRS based transmission scheme if the power metric is less than or equal to the threshold, and
process the received signal based, at least in part, on the determined transmission scheme.

16. The apparatus of claim 15, wherein the at least one processor is further configured to:
calculating a power metric of the received signal.

17. The apparatus of claim 15, wherein the at least one processor is further configured to detect a rank associated with the received signal by at least measuring a covariance on a data portion of the received signal, the power metric being based at least in part on the rank.

18. An apparatus for wireless communication, comprising:
a memory; and
at least one processor coupled to the memory and configured to:
receive a signal, the signal including at least a first cell signal from a first cell,
decide whether to use a rank associated with the received signal to determine a transmission scheme associated with the received signal,
determine the transmission scheme, and
process the received signal based, at least in part, on the determined transmission scheme,
wherein when the rank is used to determine the transmission scheme, the at least one processor is further configured to:
detect one or more ranks associated with the received signal, and
determine a number of common reference signal (CRS) ports,
wherein the transmission scheme is determined to include a CRS based transmission scheme or a user equipment reference signal (UE-RS) based transmission scheme based, at least in part, on the one or more ranks associated with the received signal and the number of CRS ports.

19. The apparatus of claim 18,
wherein the one or more ranks associated with the received signal comprises a rank observed on data tones of the received signal and a rank observed on UE-RS tones of the received signal, and
wherein the at least one processor is configured to determine the transmission scheme by:
determining that the transmission scheme includes the UE-RS based transmission scheme if the rank observed on the data tones is larger than the number of the CRS ports, determining that the transmission scheme includes the UE-RS based transmission scheme if the rank observed on the data tones does not exceed the number of the CRS ports, and no CRS precoding leads to an observed covariance matrix on the data tones, and determining that the transmission scheme includes the CRS based transmission scheme if the rank observed on the data tones is larger than 2 and the rank observed on the UE-RS tones is not equal to the rank observed on the data tones.

20. The apparatus of claim 18, wherein when the rank is not used to determine the transmission scheme, the at least one processor is further configured to detect at least one of:

whether the signal is received in a multimedia broadcast over a single frequency network (MBSFN) subframe, a transmit diversity scheme of the received signal, a modulation order on UE-RS tones of the received signal, a data symbol power on UE-RS tones of the received signal, data tones of the received signal, or a physical downlink control channel (PDCCH) of a second cell.

21. The apparatus of claim 20, wherein when the signal is detected as being received in the MBSFN subframe, the at least one processor is configured to determine the transmission scheme by identifying the transmission scheme as the UE-RS based transmission scheme.

22. The apparatus of claim 20, wherein when the transmit diversity scheme of the received signal is detected, the at least one processor is further configured to detect a rate-matching pattern of the received signal; and the at least one processor is configured to determine the transmission scheme by identifying that the transmission scheme is the UE-RS based transmission scheme based on an appearance of the transmit diversity scheme and the rate-matching pattern.

23. The apparatus of claim 20, wherein when the modulation order on UE-RS tones of the received signal is detected, the at least one processor is configured to determine the transmission scheme by identifying that the transmission scheme is the CRS based transmission scheme if the modulation order is not quadrature phase shift keying (QPSK).

24. The apparatus of claim 20, wherein when the data symbol power on UE-RS tones of the received signal is detected, the at least one processor is configured to determine the transmission scheme by identifying that the transmission scheme is the CRS based transmission scheme if the data symbol power varies across the UE-RS tones.

25. The apparatus of claim 20, wherein when the data tones of the received signal are detected, the at least one processor is further configured to estimate covariance on the data tones of the received signal; and the at least one processor is configured to determine the transmission scheme by identifying that the transmission scheme is the UE-RS based transmission scheme if the estimated covariance does not correspond to at least one of a CRS based channel codebook, a CRS based channel and transmit diversity scheme, or a CRS based channel and cyclic delay diversity scheme.

26. The apparatus of claim 20, wherein when the PDCCH of the second cell is detected, the at least one processor is further configured to decode the PDCCH of the second cell; and the at least one processor is configured to determine the transmission scheme by identifying the transmission scheme based on the decoded PDCCH of the second cell.

27. A method for wireless communication, comprising:

receiving a signal, the signal including at least a first cell signal from a first cell;

determining a transmission scheme associated with the received signal, the determined transmission scheme being one of a common reference signal (CRS) based transmission scheme or a user equipment reference signal (UE-RS) based transmission scheme, wherein the determining the transmission scheme comprises determining that the transmission scheme includes the UE-RS based transmission scheme if a signal-to-noise (SNR) metric is greater than a threshold, and determining that the transmission scheme includes the CRS based transmission scheme if the SNR metric is less than or equal to the threshold, processing the received signal based, at least in part, on the determined transmission scheme.

28. The method of claim 27, further comprising calculating the SNR metric.

29. The method of claim 28, further comprising:

detecting a rank associated with the received signal by at least measuring a covariance on a data portion of the received signal, the SNR metric being calculated based at least in part on the rank.

30. An apparatus for wireless communication, comprising:

a memory; and at least one processor coupled to the memory and configured to:

receive a signal, the signal including at least a first cell signal from a first cell, determine a transmission scheme associated with the received signal, the determined transmission scheme being one of a common reference signal (CRS) based transmission scheme or a user equipment reference signal (UE-RS) based transmission scheme, wherein the at least one processor is configured to determine the transmission scheme by determining that the transmission scheme includes the UE-RS based transmission scheme if a signal-to-noise ratio (SNR) metric is greater than a threshold, and determining that the transmission scheme includes the CRS based transmission scheme if the SNR metric is less than or equal to the threshold; and process the received signal based, at least in part, on the determined transmission scheme.

31. The apparatus of claim 30, wherein the at least one processor is further configured to calculate the SNR metric.

32. The apparatus of claim 31, wherein the at least one processor is further configured to detect a rank associated with the received signal by at least measuring a covariance on a data portion of the received signal, the SNR metric being calculated based at least in part on the rank.

* * * * *